United States Patent [19]

Sato

[11] Patent Number: 5,029,012
[45] Date of Patent: Jul. 2, 1991

[54] MAGNETIC RECORDER AND REGENERATOR

[75] Inventor: Kouichi Sato, Tokyo, Japan
[73] Assignee: Asahi Kogaku Kogyo Kabushiki Kaisha, Tokyo, Japan
[21] Appl. No.: 569,366
[22] Filed: Aug. 15, 1990

Related U.S. Application Data

[63] Continuation of Ser. No. 184,012, Apr. 20, 1988, abandoned.

[30] Foreign Application Priority Data

Apr. 20, 1987 [JP] Japan .................................. 62-97877
Apr. 20, 1987 [JP] Japan .................................. 62-97878

[51] Int. Cl.$^5$ ............................................... H04N 9/79
[52] U.S. Cl. ................................... 358/316; 358/311
[58] Field of Search ................... 358/11, 21 R, 14, 27, 358/31, 310, 311, 316, 330

[56] References Cited

U.S. PATENT DOCUMENTS

| | | | |
|---|---|---|---|
| 4,335,393 | 6/1982 | Pearson | 358/310 |
| 4,617,590 | 10/1986 | Dann | 358/21 R |
| 4,660,071 | 4/1987 | Kuribayashi | 358/11 |
| 4,717,968 | 1/1988 | Painton et al. | 358/310 |
| 4,746,990 | 5/1988 | Katoh et al. | 358/310 |
| 4,750,051 | 6/1988 | Kaneko et al. | 358/330 |
| 4,775,897 | 10/1988 | Umemoto et al. | 358/310 |
| 4,791,495 | 12/1988 | Umemoto et al. | 358/310 |

FOREIGN PATENT DOCUMENTS 60-206397 10/1985 Japan .

Primary Examiner—Donald McElheny, Jr.
Attorney, Agent, or Firm—Sandler, Greenblum & Bernstein

[57] ABSTRACT

A magnetic recorder and regenerator has a luminate signal input terminal for receiving a luminance signal, a line-sequential signal input terminal for receiving a line sequential signal consisting of alternately line-sequenced color differential signals having a d.c. level difference, and a detecting circuit for detecting the d.c. level difference in the line-sequential signal which is provided from the regenerator system of one magnetic recorder and regenerator used for signal regeneration and which is to be transferred, before being rearranged into its component color differential signals, to the recorder system of another magnetic recorder and regenerator used for signal recording. A gain-controlled controlled amplifier is responsive to the output from the detecting circuit for adjusting the d.c. level difference in the line-sequential signal to a prescribed value, whereby it can suppress fluctuations in the line-sequantial signal level during a dubbing process, avoiding picture quality deterioration. The magnetic recorder and regenerator also has a clamping circuit for clamping the d.c. level of the line-sequential signal and a color differential signal discriminating circuit for discriminating between the R-Y and B-Y components of the line-sequential signal in synchronism with a horizontal synchronizing signal, and for providing a clamp timing signal to the clamping circuit to clamp the line-sequential signal correspondng to either one of the R-Y and B-Y components.

8 Claims, 6 Drawing Sheets $f_1 = 1.2 M_{HZ}$
$f_2 = 1.3 M_{HZ}$

MAGNETIC RECORDER AND REGENERATOR

This application is a continuation of application Ser. No. 07/184,012, filed Apr. 20, 1988, now abandoned.

BACKGROUND OF THE INVENTION

The present invention relates in general to a magnetic recorder and regenerator having, in its recorder system, a luminance signal input terminal for receiving a luminance signal and a line-sequential signal input terminal for receiving a line-sequential signal consisting of a series of alternately line-sequenced color differential signals having a d.c. level difference therebetween, the line-sequential signal and the luminance signal being frequency-modulated and recorded in a magnetic recording medium. The present invention relates in particular to a magnetic recorder and regenerator of the above-described type which is capable of dubbing signal without including any picture quality deterioration.

A magnetic recorder and regenerator, such as an electronic still camera, is known which comprises a recorder system and a regenerator system. The recorder system is adapted to frequency-modulate a line-sequential signal from a line-sequencing circuit which produces the line-sequential signal by alternately line-sequencing color differential signals while frequency-modulating a luminance signal, and is further adapted to synthesize a recording signal by frequency-superposing the thus frequency-modulated line-sequential and luminance signals, the recording signal being recorded on a magnetic recording medium. The regenerator system is adapted to reproduce the luminance and line-sequential signals by frequency-demodulating the signals recorded on the magnetic recording medium, and to regenerate the original color differential signals by rearranging the line-sequential signal into the original parallel color differential signals by means of a rearranging circuit. See Japanese laid-open patent application 206397/1985, for example.

As shown in FIG. 1, dubbing may be done using two magnetic recorder and regenerators 1, 2. By dubbing, recordings on a magnetic recording medium set in one magnetic recorder and regenerator 1 are recorded on the other magnetic recorder and regenerator 2.

Prior art apparatus 1, 2 have connection terminals which include a luminance signal input terminal 4 and color differential signal input terminals 5, 6 provided on the input side of the recorder system 3, and a luminance signal output terminal 8 and color differential signal output terminals 9, 10 provided on the output side of the regenerator system 7. For the dubbing operation, the luminance signal output terminal 8 of apparatus 1 is connected to the luminance signal input terminal 4 of apparatus 2, while the color differential signal output terminals 9, 10 of apparatus 1 are connected to the color differential signal input terminals 5, 6 of apparatus 2, respectively.

In the dubbing process by the prior art magnetic recorder and regenerator apparatus 1, 2, color differential signals reproduced by the rearranging circuit in the regenerator system 7 of apparatus 1, are again line-sequenced by the line-sequencing circuit in the recorder system 3 of apparatus 2 and then recorded on a magnetic recording medium set in apparatus 2.

The rearranging of color differential signals by the rearranging circuit in the regenerator system 7 of apparatus 1, as well as the line-sequencing of these color differential signals by the line-sequencing circuit in recorder system 3 of apparatus 2, however, is essentially not necessary in the dubbing process because the color differential signals are recorded on a recording medium in the line-sequenced form. A dubbing process by means of such prior art apparatus, involving the essentially unnecessary steps of the rearranging and the subsequent line-sequencing of color differential signals, is therefore accompanied by a deterioration if picture quality due to such unnecessary steps.

Thus, an arrangement has been proposed which comprises a line-sequential signal output terminal for extracting the frequency-demodulated line-sequential signal during the dubbing process, which terminal is provided on the input side of the rearranging circuit in the reproducer system, and a line-sequential signal input terminal provided on the output side of the line-sequencing circuit in the recorder system, which terminal is switched for receiving the line-sequential signal from the line-sequential signal output terminal during the dubbing process. When signals recorded on a magnetic recording medium set in one magnetic recorder and regenerator are to be dubbed onto another magnetic recording medium set in another magnetic recorder and regenerator, the line-sequential signal may transferred, before being supplied to the rearranging circuit, from one magnetic recorder and regenerator to the output side of the line-sequencing circuit in the recorder system of the other magnetic recorder and regenerator, whereby the signals may be dubbed onto the magnetic medium set in the other recorder and regenerator.

The above-described arrangement does not require the essentially unnecessary steps of rearranging and line-sequencing color differential signals during dubbing process, and therefore, will not suffer from a pictue quality deterioration which can otherwise arise from such steps.

Picture quality deterioration may occur from factors other than the above-described steps. For example, it may occur if a luminance or line-sequential signal with fluctuation in the level thereof is supplied for recording, without any compensating process, from the regenerator system of a megnetic recorder and regenerator to the recorder system of another magnetic recorder and regenerator. Such fluctuation, however, will cause deterioration in the picture quality in the dubbing process and will make it difficult to accurately reproduce color pictures.

Further, in electronic still cameras, an R - Y component color differential signal, or red color differential signal, and a B - Y component color differential signal, or blue color differential signal, are used which have different d.c. levels $V_1$ and $V_2$ (see FIG. 2). The d.c. level difference is provided between these R - Y and B - Y color differential signals in order to give them different center frequencies $f_1$ and $f_2$ by means of frequency-modulation, such difference between the center frequencies being essential to the separation of such R - Y and B - Y components in the step of regenerating the line-sequential signal. These center frequencies $f_1$ and $f_2$ are set to 1.2 MHz and 1.3 MHz, respectively.

Thus, if the line-sequential signal fluctuates in the d.c. levels $V_1$ and $V_2$, the center frequencies $f_1$ and $f_2$ fluctuates in response to the fluctuation of the line-sequential signal, and a deterioration of the picture quality is caused. Thus, the d.c. levels $V_1$ and $V_2$ must be kept constant by clampers.

In such a case, since the reference d.c. levels $V_1$ and $V_2$ will alternate with each other upon the termination of each horizontal scanning cycle, it is conceivable that a signal with a frequency equal to one half of the horizontal scanning frequency may be used as a clamp timing a signal. Such signal with the frequency equal to one half of that of the horizontal scanning frequency, however, will in itself not determine whether the clamped d.c. level is the R - Y component d.c. level $V_1$ or the B - Y component d.c. level $V_2$. If a timing error of in the d.c. levels occur, the line-sequential signal will include errors, due to the erroneous clamp timing which will be recorded, causing further deteriorations in the picture quality. Prior art magnetic recorder and regenerators will not be able to faithfully reproduce such color pictures.

SUMMARY OF THE INVENTION

A first object of the present invention is therefore to provide a magnetic recorder and regenerator which has a line-sequential signal input terminal in its recorder system through which a line-sequential signal is received, and which is capable of reducing the deterioration of a picture quality due to fluctuations in the level of the line-sequential signal during dubbing.

A second object of the present invention is to provide a magnetic recorder and regenerator which is capable of reducing the deterioration of a picture quality due to an erroneous clamp timing of the d.c. level of the line-sequential signal during dubbing.

A third object of the present invention is to provide a magnetic recorder and regenerator that is suitable for a dubbing process performed with the use of an electronic still camera.

In order to achieve the first object, in view of the fact that the line-sequential signal produced by the regenerator system of one magnetic recorder and regenerator for signal reproduction is transferred to the recorder system of another magnetic recorder and regenerator for recording before rearranging the process of the line-sequential signal, the magnetic recorder and regenerator according to the present invention is provided with a detecting circuit for detecting the d.c. level difference in the line-sequential signal, and with a gain-controlled amplifier for adjusting the d.c. level difference in the line-sequential signal to a prescribed value in accordance with the output from the detecting circuit.

In order to achieve the second object, the apparatus according to the present invention is provided with a clamping circuit for clamping the d.c. level of the line-sequential signal, and with a color differential signal discriminating circuit for discriminating between the R - Y and B - Y components of the line-sequential signal in synchronism with a horizontal synchronizing signal and for supplying a clamp timing signal, which corresponds to either one of the R - Y or B - Y component, to the clamping circuit to clamp the line-sequential signal.

DETAILED DESCRIPTION OF THE PREFERRED EMBODIMENTS

Figure 1:
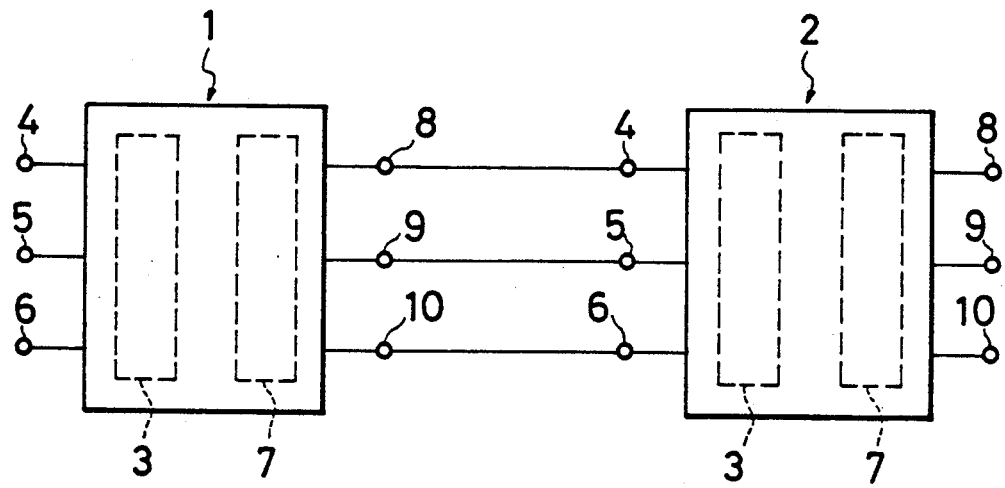
FIG. 1 is a diagram showing the connection for dubbing between two prior art magnetic recorder and regenerators.
Figure 2:
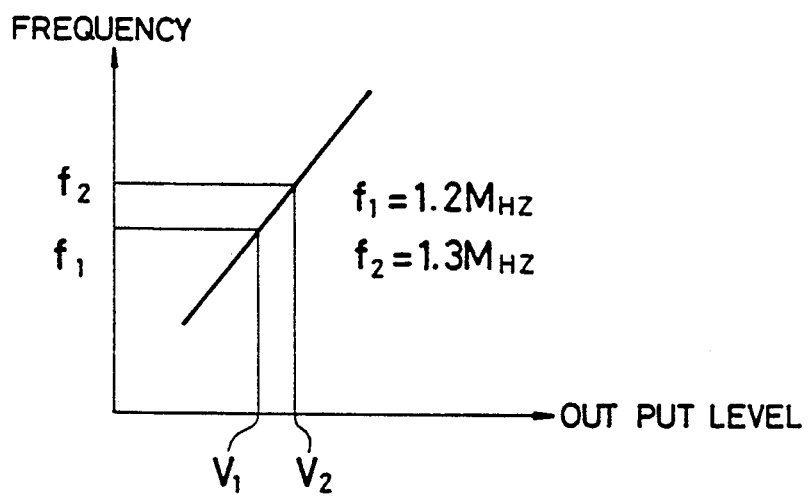
FIG. 2 is a graph showing frequency versus d.c. level of a color differential signal.
Figure 3:
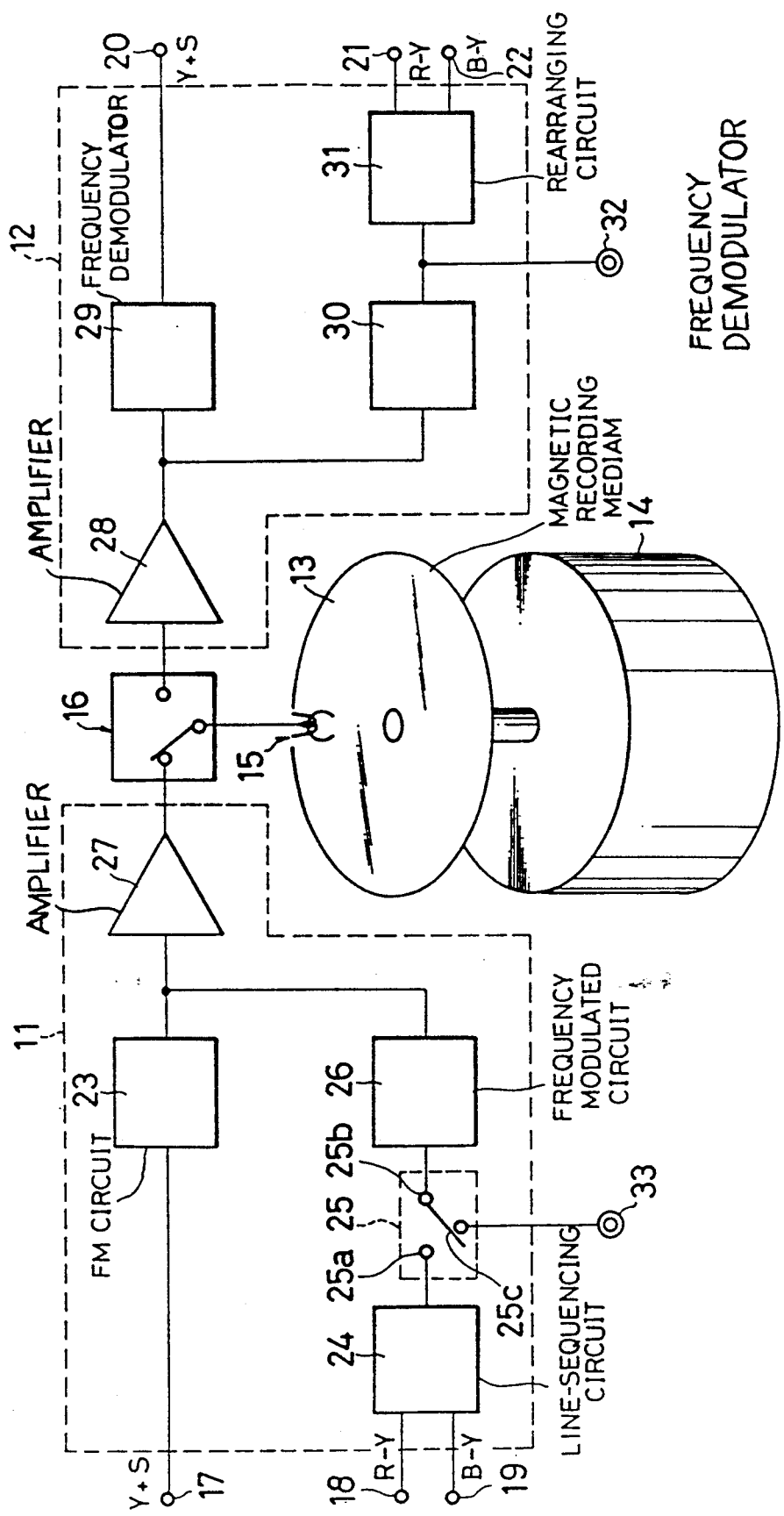
FIG. 3 is a diagram showing a general circuit arrangement of a magnetic recorder and reproducer according to the present invention.

FIG. 3 schematically shows a circuit arrangement of the magnetic recorder and regenerator according to the present invention. In FIG. 3, 11 denotes a recorder system, 12 a regenerator system, 13 a magnetic recording medium in the form of a magnetic disc, 14 a spindle motor for driving the magnetic disc, 15 a magnetic head, and 16 a changing switch for changeover between the recorder system and the regenerator system.

On the input side, the recorder system 11 is provided with a luminance signal input terminal 17 for receiving a luminance signal Y plus horizontal synchronizing signal S, and color differential signal input terminals 18, 19 for receiving color differential signals R -Y, B - Y.

On the output side, the repoducer system 12 is provided with a luminance signal output teminal 20 for the output of the luminance signal together with vertical and horizontal synchronizing signals S, and color differential signal output terminals 21, 22 for the output of the color differential signals R - Y, B - Y.

The luminance signal Y and color differential signals R -Y, B - Y applied to the input terminals 17, 18, 19 are derived by processing the output signals from a solid state image sensing device in an electronic still camera.

The luminance signal input terminal 17 is connected to a frequency-modulating (FM) circuit 23. The luminance signal Y is frequency modulated by the FM circuit 23. The color differential signal input terminals 18, 19 are connected to a line-sequencing circuit 24. The color differenctial signals R - Y, B - Y are applied to the line-sequencing circuit in parallel.

To alternately record the parallel color differential signals R - Y, B - Y on the magnetic disk 13, one for each horizontal scanning period, i.e. R - Y for one horizontal scanning period (1H) and B - Y for the next horizontal scanning period and again R - Y for the following horizontal scanning period and so on. The line-sequencing circuit 24 will switch the color differential signals R - Y and B - Y alternately for every 1H and thereby provide a line-sequential signal consisting of a sequence of alternating color differential signals, one for each horizontal scanning period. The switching is done upon the occurrence of each horizontal synchronizing signal S. Meanwhile, the color differential signals R - Y, B - Y are given a d.c. level difference therebetween in the line-sequencing process so that these signals can be easily discriminated from each other when regenerated.

The line-sequential signal from the line-sequencing circuit 24 is supplied to a frequency-modulating (FM) circuit 26 through a changeover switch 25 for dubbing.

The construction of switch 25 will be described later. The line-sequential signal is frequency-modulated by the FM circuit 26. The frequency-modulated line-sequential signal and the frequency-modulated color differential signals are combined into a recording signal by frequency-superposition. The recording signal is amplified by a recorder amplifier 27 and recorded onto the recording medium 13 by the magnetic head 15.

The regenerator system 12 comprises a regenerator amplifier 28, frequency-demodulating circuits 29, 30, and a rearranging circuit 31. The playback signal played back by the magnetic head 15 is amplified by the regenerator amplifier 28 and supplied to the frequency-demodulating circuits 29, 30. The frequency-demodulator 29 has the function of frequency-demodulating the playback signal into the luminance signal Y.

The output of the frequency-demodulater 29 is connected to luminance signal output terminal 20. The frequency-demodulator 30 has the function of frequency-demodulating the playback signal into the line-sequential signal. The output of the frequency-demodulator 30 is connected to the input of the rearranging circuit 31.

The rearranging circuit 31 functions to restore the original color differential signals R - Y, B - Y from the frequency-demodulated line-sequential signal. The outputs of the rearranging circuit 31 are connected to the color differential signal output terminals 21, 22. The color differential signals R - Y, B - Y are provided in parallel from these terminals 21, 22. A color television set, for example, (not shown) having its connection terminals connected to the luminance signal output 20 and color differential signal outputs 21, 22, can produce a still color picture on its screen.

Figure 4:
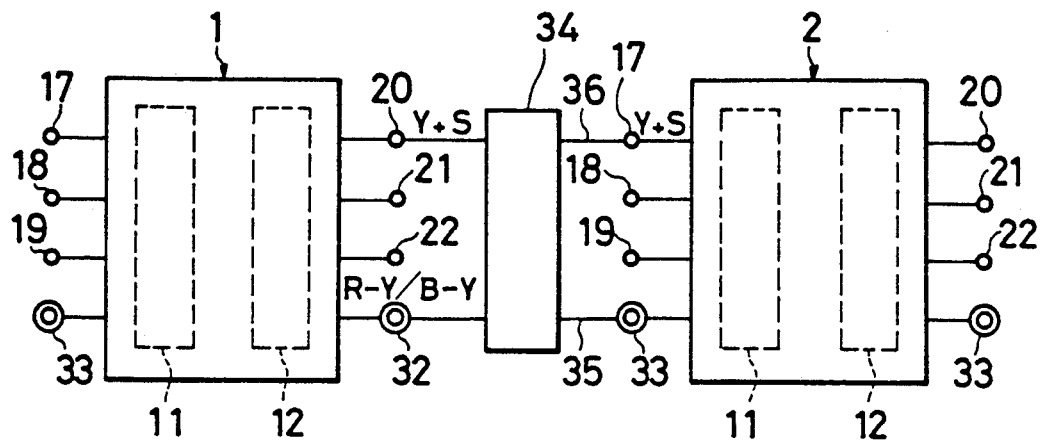
FIG. 4 is a diagram showing two magnetic recorder and regenerators according to the present invention, connected together for dubbing.

Line-sequential signal output terminal 32 outputs the line-sequential signal during dubbing, and is located between the output of the frequency-demodulator 30 and the input of the rearranging circuit 31. To the changeover switch 25, there is connected a line-sequential signal input terminal 33 which is to be connected to the line-sequential signal output terminal 32 during dubbing. To perform dubbing, the line-sequential signal output terminal 32 of magnetic recorder and regenerator 1 is connected via an automatic gain control circuit 34 and cable 35 to the line-sequential signal input terminal 33 of magnetic recorder and reproducer 2, while the luminance signal output terminal 20 of apparatus 1 is connected via the automatic gain control circuit 34 and cable 36 to the luminance signal input terminal 17 of apparatus 2, as shown in FIG. 4.

Figure 5:
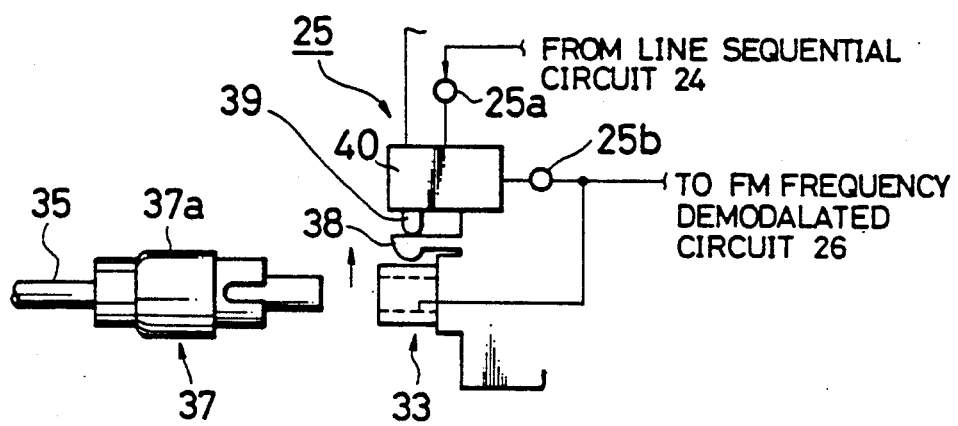
FIG. 5 is a view showing the appearance of a change-over switch for use with the magnetic recorder and regenerator shown in FIG. 4.
Figure 6:
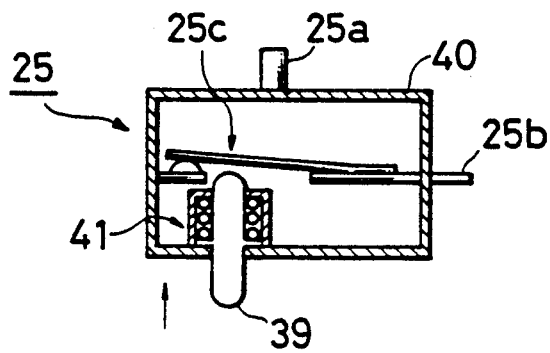
FIG. 6 is a cross sectional view showing the principal parts of the changeover switch.

The changeover switch 25 has a terminal 25a that is connected to the line-sequencing circuit 24, a terminal 25b that is connected to the frequency-modulator 26, and a movable contact 25c. The changeover switch 25 is of the push-off type, for example, as shown in FIGS. 5 and 6. The mechanical structure of the switch 25 is as follows: when a plug 37, attached to the cable 35, is inserted into a jack of the line-sequential signal input terminal 33, body 37a of the plug 37 will move a push member 38 in the direction of the arrow shown in see FIG. 5, so that the movable member 39 is moved in the direction of the arrow shown is see FIG. 6. Thus, by connecting cable 35, the movable contact 25c is automatically switched from one position for connection to the line-sequencing circuit 24 to the position for connection to the line-sequential signal input terminal 33.

In FIGS. 5 and 6, 40 denotes a housing forming a part of the changeover switch 25, while 41 denotes a spring for urging the movable member 38 against the push member 37. The construction of the changeover switch 25, however, is not limited to the above-described one.

Figure 7:
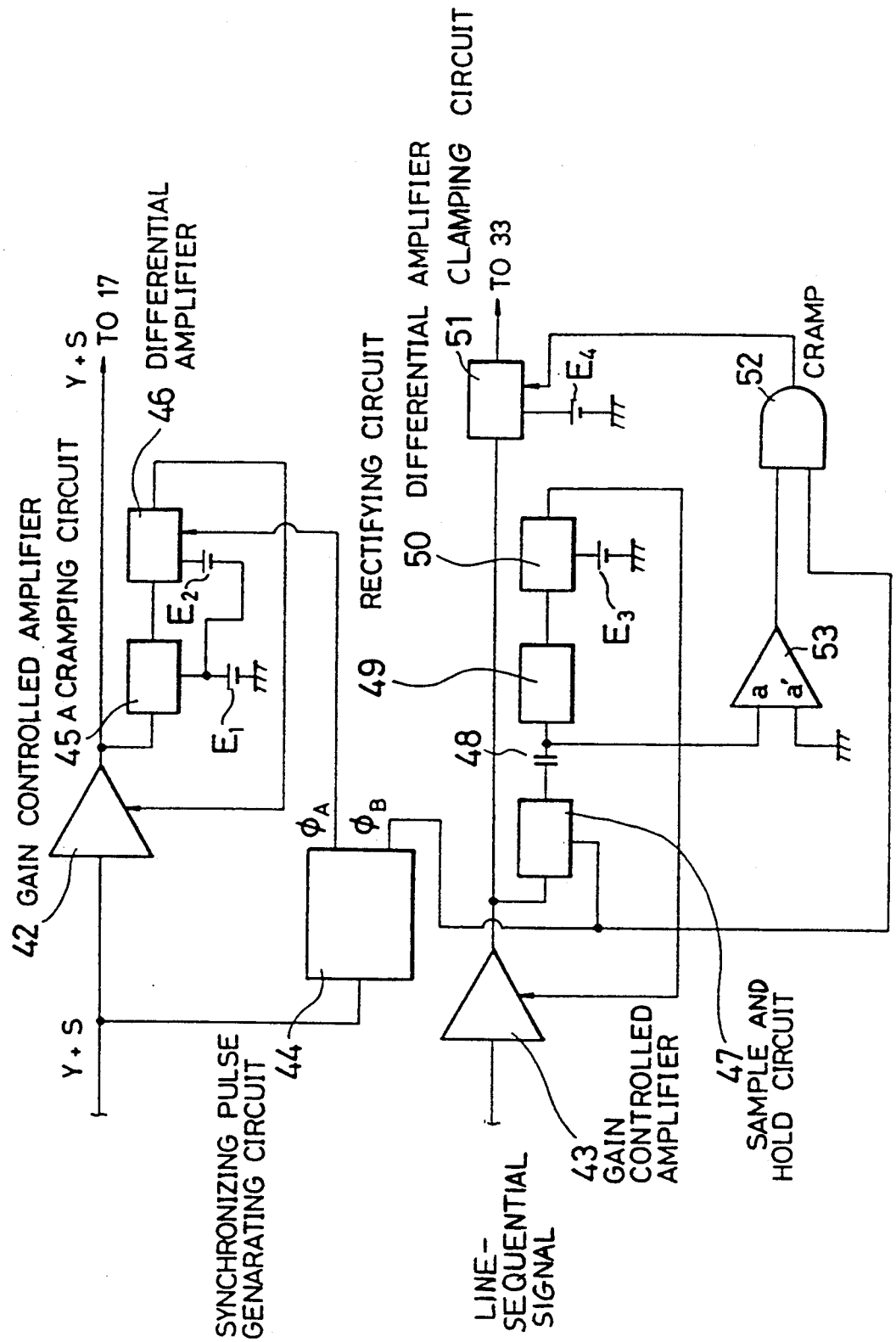
FIG. 7 is a block diagram schematically showing the principal circuits of the magnetic recorder and regenerator according to the present invention.
Figure 8:
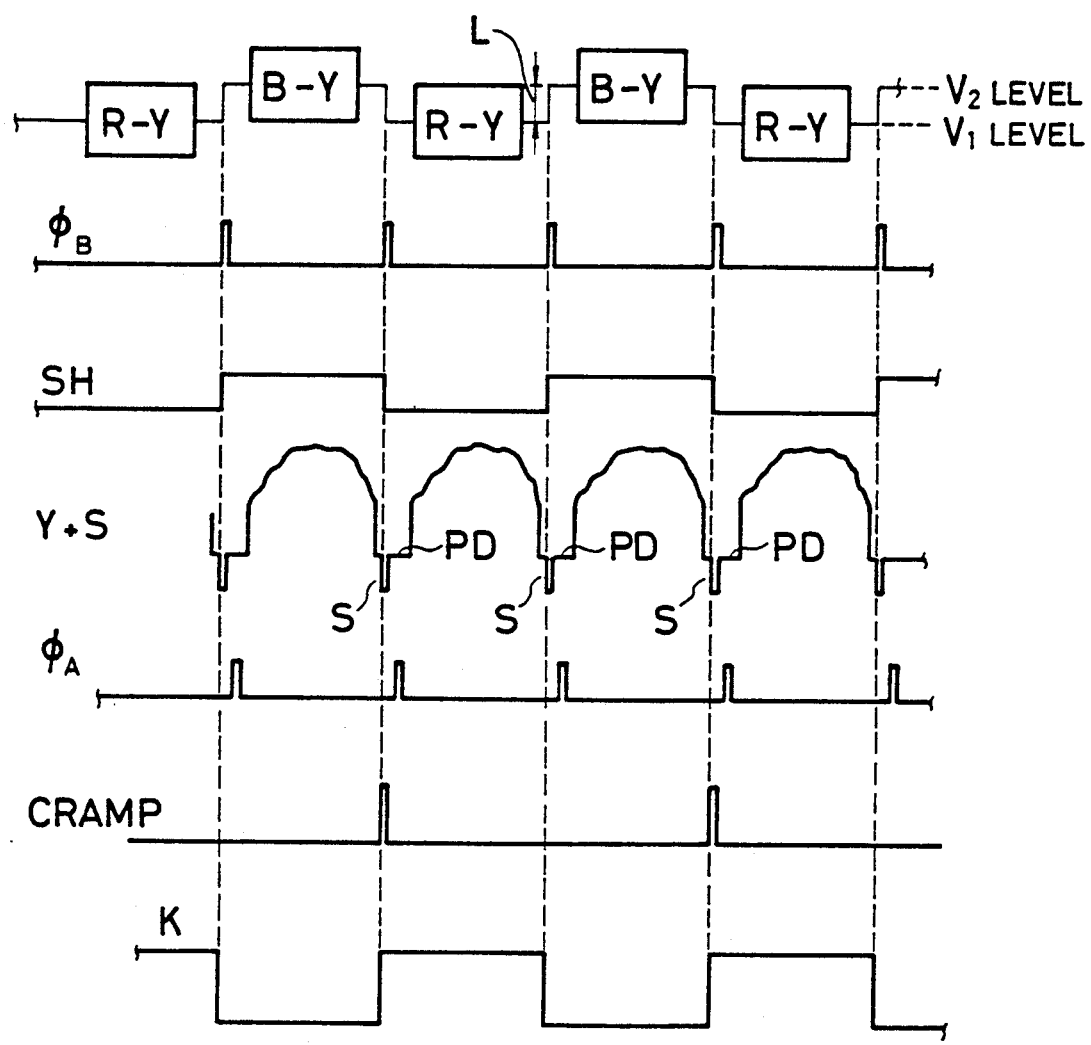
FIG. 8 is a graph showing signal waveformes in the principal circuits.

The automatic gain control circuit 34 includes gain-controlled amplifiers 42, 43 and a synchronizing pulse generating circuit 44, as shown in FIG. 7. The gain-controlled amplifier 42 and the synchronizing pulse generator 44 are connected to receive a luminance signal Y which includes horizontal synchronizing pulses S shown in FIG. 8. The other gain-controlled amplifier 43 is connected to receive a line-sequential signal consisting of a series of alternately line-sequenced color differential signals R - Y and B - Y which have a d.c. level difference therebetween.

The gain-controlled amplifier 42 functions to keep the output level of the luminance signal Y at a predetermined level. Clamping circuit 45 is connected to the output stage of the gain-controlled amplifier 42. The clamper 45 functions to clamp the sync. tip level of the horizontal synchronizing pulse S. The output luminance signal Y from the clamper 45 is supplied to a differential amplifier 46.

The differential amplifier 46 is controlled by a synchronizing pulse $\Phi_A$ from the synchronizing pulse generator 44. The synchronizing pulse $\Phi_A$ is necessarily synchronized with the occurrence of the pedestal level PD of the luminance signal Y. Thus, pulse $\Phi_A$ is generated at a constant delay time from the timing of the horizontal synchronizing signal S. The differential amplifier 46 compares the pedestal level PD with a reference level at the moment the synchronizing pulse $\Phi_A$ is generated, thereby controlling the gain-controlled amplifier 42 so that the luminance signal Y from amplifier 42 can be adjusted to the predetermined level.

Further, in FIG. 7, reference marks $E_1$ and $E_2$ are voltage sources for providing reference voltages for clamper 45 and differential amplifier 46, respectively.

The output of the other gain-controlled amplifier 43 is connected to a sample and hold circuit 47. The sample and hold circuit 47 functions to sample and hold the color differential signals B - Y and R - Y. The synchronizing pulse generator 44 outputs a synchronizing pulse $\Phi_B$ to the sample and hold circuit 47 to sample and hold the output levels of the color differential signals B - Y and R - Y in synchronism with the horizontal synchronizing signal S. Output SH from the sample and hold circuit 47 is supplied through capacitor 48 to rectifying circuit 49 and is thereby rectified, and compared with reference voltage $E_3$ by a differential amplifier 50.

Differential amplifier 50 compares the reference voltage $E_3$ with the rectified output from rectifier 49 to control the gain-controlled amplifier 43, such that the difference between the reference voltage $E_3$ and the rectified output is reduced. The sample and hold circuit 47, capacitor 48, rectifier 49, and differential amplifier 50 act in combination as a detecting circuit for detecting the d.c. level difference in the line-sequential signal, so that the d.c. level difference L in the line-sequential signal from the gain-controlled amplifier 43 is adjusted to a prescribed value.

Figure 9:
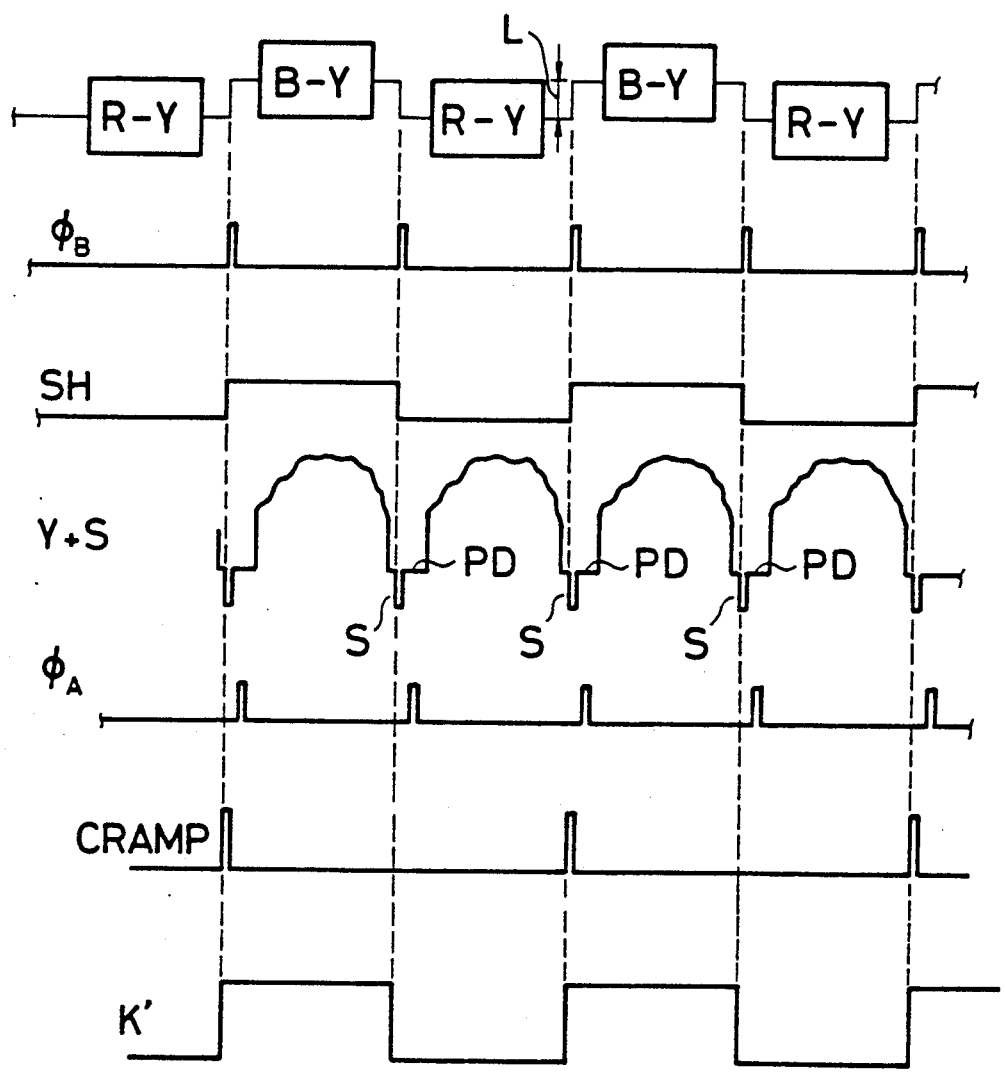
FIG. 9 is a graph showing the signal waveforms in another embodiment of the principal parts shown in FIG. 7.

The line-sequential signal from the gain-controlled amplifier 43 is supplied to a clamping circuit 51, shown in FIG. 7. Clamper 51 functions to clamp either one of the d.c. output levels $V_1$ and $V_2$ of the line-sequential signal, and reference mark $E_4$ denotes a voltage source for determining the clamp level. Clamper 51 clamps either the R - Y component d.c. output level $V_1$ or the B - Y component d.c. level $V_2$ in response to a clamp timing signal CRAMP (see FIGS. 8 and 9) from AND circuit 52.

The AND circuit 52 functions in combination with a comparator 53 as a color differential signal discriminating circuit for discriminating between the R - Y and B - Y components of the line-sequential signal. An input terminal a of the comparator 53 is connected to capacitor 48, the output from the sample and hold circuit 47 being deprived of the d.c. component by capacitor 48 and then supplied to comparator 53. The other input terminal a' is connected to ground. If input terminal a is the inverting input and the other input terminal a' is the non-inverting input, then the comparator 53 produces a discriminating signal K, shown in FIG. 8. If terminal a is the non-inverting input and the other terminal a' is the inverting input, then the comparator 53 produces discriminating signal K', shown in FIG. 9. An input of the AND circuit 52 receives either of the discriminating signal K or K', while the other input receives the synchronizing pulse $\Phi_B$. If the synchronizing signal $\Phi_B$ is supplied to the AND circuit 52 when the discriminating signal K or K' is at a high level, then the clamp timing signal CRAMP is supplied to the clamper 51. If the circuit is arranged to produce the discriminating signal K shown in FIG. 8, then the d.c. output level $V_1$ is clamped upon the occurrence of each R - Y component of the line-sequential signal. If the circuit is arranged to produce the discriminating signal K' shown in FIG. 9, then the d.c. level $V_2$ is clamped upon the occurrence of each B - Y component.

In the above-described embodiment, the automatic gain control circuit 34 and the color differential signal discriminating circuit are provided between the magnetic recorder and regenerators 1 and 2. These circuits may also be provided in the regenerator system 12 of one magnetic recorder and regenerator 1, or in the recorder system 11 of the other magnetic recorder and regenerator 2.

As described above, the recorder system is provided with a detecting circuit for detecting the d.c. level difference in the line-sequential signal to keep the d.c. level difference between the color differential signals at a prescribed value, and with a gain controlled circuit for controlling the d.c. level difference in the line-sequential signal to a prescribed value depending on the output from the detecting circuit, so that the d.c. level difference in the line-sequential signal can be kept at a prescribed value. Thus, it is possible to reduce picture quality deterioration due to level difference fluctuations during dubbing.

Further, it is provided with a clamper for clamping the d.c. level of the line-sequential signal, and with a color differential signal discriminating circuit for discriminating between the R - Y and B - Y components of the line-sequential signal in synchronism with the horizontal synchronizing signal and for supplying a clamp timing signal to the clamper to clamp the line-sequential signal, the clamp timing signal corresponding either to the R - Y or B - Y component, whereby it is also possible to reduce picture quality deterioration due to d.c. level clamp timing during dubbing.

What is claimed is:

1. A magnetic recorder and regenerator comprising:
 a luminance signal input terminal provided in a recorder system thereof for receiving a luminance signal;
 a line-sequential signal input terminal provided in the recorder system for receiving a line-sequential signal consisting of alternately arranged color differential signals having a d.c. level difference therebetween;
 a detecting circuit for detecting the d.c. level difference in said line-sequential signal; and
 a gain-controlled amplifier for controlling the d.c. level difference in said line-sequential signal to a prescribed value depending on the output from said detecting circuit.

2. A magnetic recorder and regenerator comprising:
 a luminance signal output terminal provided in a reproducer system thereof for the output of a luminance signal;
 a line-sequential signal output terminal provided in the reproducer system for outputting a line-sequential signal consisting of a series of alternately arranged color differential signals having a d.c. level difference therebetween;
 a detecting circuit for detecting the d.c. level difference in said line-sequential signal; and
 a gain-controlled circuit for controlling the d.c. level difference to a prescribed value depending on the output from said detecting circuit.

3. A magnetic recorder and regenerator comprising:
 a luminance signal input terminal provided in a recorder system thereof for receiving a luminance signal;
 a line-sequential signal input terminal provided in the recorder system for receiving a line-sequential signal consisting of alternately arranged color differential signals having a d.c. level difference therebetween;
 a luminance signal output terminal provided in a regenerator system of said magnetic recorder and regenerator for outputting a luminance signal;
 a line-sequential signal output terminal provided in the regenerator system for the output of a line-sequential signal consisting of alternately arranged color differential signals having a d.c. level difference therebetween;
 a detecting circuit for detecting the d.c. level difference in the line-sequential signal from said regenerator system; and
 a gain-controlled amplifier for controlling the d.c. level difference in the line-sequential signal from said regenerator system to a prescribed value depending on the output from said detecting circuit.

4. A magnetic recorder and regenerator, comprising:
 a luminance signal input terminal provided in a recorder system of the magnetic recorder and regenerator for receiving a luminance signal;
 a frequency-modulating circuit connected to said luminance signal input terminal for frequency-modulating the luminance signal;
 color differential signal input terminals provided in the recorder system for receiving parallel R - Y and B - Y component color differential signals;
 a line-sequencing circuit connected to the color differential signal input terminals for alternately line-sequencing said R - Y and B - Y component color differential signals to thereby produce a line-sequential signal consisting of alternately arranged R - Y and B - Y component color differential signals having a d.c. level difference therebetween;
 a frequency-modulating circuit provided after the line-sequencing circuit for frequency-modulating the color differential signals which have been line-sequenced by the line sequencing circuit;

a line sequential signal input terminal provided in said recorder system for receiving a line-sequential signal consisting of alternately arranged color differential signals having a d.c. level difference therebetween;

a changeover switch, provided between said line-sequencing circuit and said frequency-modulating circuit provided after said line-sequencing circuit, for changeover between said line-sequential signal input terminal and said line-sequencing circuit;

a frequency-demodulating circuit provided in the regenerator system for frequency-demodulating a recording signal recorded in a magnetic recording medium into a luminance signal;

a luminance signal output terminal connected to the frequency-demodulating circuit for the output of the luminance signal derived by the frequency-demodulation;

a frequency-demodulating circuit for frequency - demodulating a recording signal recorded in a magnetic recording medium into a line-sequential signal;

a rearranging circuit for providing parallel R - Y and B - Y component color differential signals by rearranging the line-sequential signal derived by said frequency-demodulation performed by the frequency-demodulating circuit;

color differential signal output terminals connected to the rearranging circuit for the output of the R - Y and B - Y component color differential signals, respectively;

a line-sequential signal output terminal connected between the frequency-demodulating circuit of the regenerator system and said rearranging circuit for the output of the line-sequential signal derived by the frequency-demodulation from recording signals recorded in a magnetic recording medium;

a detecting circuit for detecting the d.c. level difference in the line-sequential signal supplied from said regenerator system;

a gain-controlled amplifier for controlling the d.c. level difference in the line-sequential signal from said regenerator system depending on the output from the detecting circuit;

wherein when dubbing is to be performed, said changeover switch switches from a connecting position to connect together said frequency-demodulating circuit and said line-sequencing circuit, to another connecting position to connect together said frequency-modulating circuit and said line-sequential signal input terminal.

5. A magnetic recorder and regenerator comprising:

a luminance signal input terminal provided in a recorder system of the magnetic recorder and regenerator for receiving a luminance signal;

a frequency-modulating circuit connected to said luminance signal input terminal for frequency-modulating the luminance signal;

color differential signal input terminals provided in the recorder system for receiving parallel R - Y and B - Y component color differential signals;

a line-sequencing circuit connected to the color differential signal input terminals for alternately line-sequencing the R - Y and B - Y component color differential signals to thereby produce a line-sequential signal consisting of alternately arranged R - Y and B - Y component color differential signals having a d.c. level difference therebetween;

a frequency-modulating circuit provided after the line-sequencing circuit for frequency-modulating the line-sequential signal;

a line-sequential signal input terminal provided in the recorder system for receiving a line-sequential signal consisting of alternately arranged color differential signals having a d.c. level difference therebetween;

a changeover switch provided between said line-sequencing circuit and the frequency-modulating circuit provided after said line-sequencing circuit, for changeover between said line-sequential signal input terminal and said line-sequencing circuit;

a frequency-demodulating circuit provided in a regenerator system of said magnetic recorder and regenerator for frequency-demodulating a recording signal recorded in a magnetic recording medium into a luminance signal;

a luminance signal output terminal connected to the frequency-demodulating circuit for the output of the luminance signal derived by the frequency-demodulation;

a frequency-demodulating circuit for frequency-demodulating a recording signal recorded in a magnetic recording medium into a line-sequential signal;

a rearranging circuit for rearranging the line-sequential signal derived by the frequency-demodulation performed by the frequency-demodulating circuit to thereby provide parallel R - Y and B - Y component color differential signals;

color differential signal output terminals connected to the rearranging circuit for the output of the R - Y and B - Y component color differential signals;

a line-sequential signal output terminal provided between the frequency-demodulating circuit of the regenerator system and said rearranging circuit for the output of the line-sequential signal derived by the frequency-demodulation from a recording signal recorded in a magnetic recording medium;

a detecting circuit for detecting the d.c. level difference in the line-sequential signal from said regenerator system;

a gain-controlled amplifier for controlling the d.c. level difference in the line-sequential signal from said regenerator system to a prescribed value depending on the output from the detecting circuit;

wherein when dubbing is to be performed, said changeover switch switches from a connecting position to connect together said frequency modulating circuit and said line-sequencing circuit, to another connecting position to connect together said frequency-modulating circuit and said line-sequential signal input terminal.

6. A magnetic recorder and regenerator comprising, at least:

a luminance signal input terminal provided in a recorder system of the magnetic recorder and regenerator for receiving a luminance signal;

a line-sequential signal input terminal provided in the recorder system for receiving a line-sequential signal consisting of alternately line-sequenced R - Y and B - Y component color differential signals having a d.c. level difference therebetween;

a luminance signal output terminal provided in a regenerator system of the magnetic recorder and regenerator for the output of a luminance signal;

a line-sequential signal output terminal provided in the regenerator system for the output of a line-sequential signal consisting of alternately line-sequenced color differential signals;

a detecting circuit for detecting the d.c. level difference in the line-sequential signal from said regenerator system;

a gain-controlled amplifier for controlling the d.c. level difference in the line-sequential signal from said regenerator system depending on the output from the detecting circuit;

a clamping circuit for clamping the d.c. level of the line-sequential signal from said gain-controlled amplifier; and a color differential signal discriminating circuit for dicriminating between the R - Y and B - Y components of said line-sequential signal in synchronism with a horizontal synchronizing signal, and for providing a clamp timing signal to said clamping circuit to clamp the line-sequential signal corresponding to either one of the R - Y and B - Y components.

7. A magnetic recorder and regenerator comprising:

a luminance signal input terminal provided in a recorder system of the magnetic recorder and regenerator for receiving a luminance signal;

a frequency-modulating circuit connected to said luminance signal input circuit for frequency-modulating the luminance signal;

color differential signal input terminals provided in the recorder system for receiving parallel R - Y and B - Y component color differential signals;

a line-sequencing circuit connected to the color differential signal input terminals for alternately line-sequencing the R - Y and B - Y component color differential signals to thereby produce a line-sequential signal consisting of alternately arranged R - Y and B - Y component color differential signals having a d.c. level difference therebetween;

a frequency-modulating circuit provided after the line-sequencing circuit for frequency-modulating the line-sequential signal;

a line-sequential signal input terminal provided in the recorder system for receiving a line-sequential signal consisting of alternately arranged color differential signals having a d.c. level difference therebetween;

a changeover switch provided between said line-sequencing circuit and the frequency-modulating circuit provided after said line-sequencing circuit, for changeover between said line-sequential signal input terminal and said line-sequencing circuit;

a frequency-demodulating circuit provided in a regenerator system of said magnetic recorder and regenerator for frequency-demodulating a recording signal recorded in a magnetic recording medium into a luminance signal;

a luminance signal output terminal connected to the frequency-demodulating circuit for the output of the luminance signal derived by the frequency-demodulation;

a frequency-demodulating circuit for frequency-demodulating a recording signal recorded in a magnetic recording medium into a line-sequential signal;

a rearranging circuit for rearranging the line-sequential signal derived by the frequency-demodulation performed by the frequency-demodulating circuit to thereby provide parallel R - Y and B - Y component color differential signals;

color differential signal output terminals connected to the rearranging circuit for the output of the R - Y and B - Y component color differential signals;

a line-sequential signal output terminal provided between the frequency-demodulating circuit of the regenerator system and said rearranging circuit for the output of the line-sequential signal derived by the frequency-demodulation from a recording signal recorded in a magnetic recording medium:

a clamping circuit for clamping the d.c. level of the line-sequential signal from said regenerator system;

a color differential signal discriminating circuit for discriminating between the R - Y and B - Y components of said line-sequential signal in synchronism with a horizontal synchronizing signal, and for providing a clamp timing signal to said clamping circuit to clamp the line-sequential signal corresponding to either one of the R - Y and B - Y components, wherein when dubbing is to be performed, said changeover switch switches from a connecting position to connect together said frequency-demodulating circuit and said line-sequencing circuit, to another connecting position to connect together said frequency-modulating circuit and said line-sequential signal input terminal.

8. A magnetic recorder and regenerator comprising:

a luminance signal input terminal provided in a recorder system of the magnetic recorder and regenerator for receiving a luminance signal;

a frequency-modulating circuit connected to said luminance signal input circuit for frequency-modulating the luminance signal;

color differential signal input terminals provided in the recorder system for receiving parallel R - Y and B - Y component color differential signals;

a line-sequencing circuit connected to the color differential signal input terminals for alternately line-sequencing the R - Y and B - Y component color differential signals to thereby produce a line-sequential signal consisting of alternately arranged R - Y and B - Y component color differential signals having a d.c. level difference therebetween;

a frequency-modulating circuit provided after the line-sequencing circuit for frequency-modulating the line-sequential signal;

a line-sequential signal input terminal provided in the recorder system for receiving a line-sequential signal consisting of alternately arranged color differential signals having a d.c. level difference therebetween;

a changeover switch provided between said line-sequencing circuit and the frequency-modulating circuit provided after said line-sequencing circuit, for changeover between said line-sequential signal input terminal and said line-sequencing circuit;

a frequency-demodulating circuit provided in a regenerator system of said magnetic recorder and regenerator for frequency-demodulating a recording signal recorded in a magnetic recording medium into a luminance signal;

a luminance signal output terminal connected to the frequency-demodulating circuit for the output of the luminance signal derived by the frequency-demodulation;

a frequency-demodulating circuit for frequency-demodulating a recording signal recorded in a magnetic recording medium into a line-sequential signal;

a rearranging circuit for rearranging the line-sequential signal derived by the frequency-demodulation performed by the frequency-demodulating circuit to thereby provide parallel R - Y and B - Y component color differential signals;

color differential signal output terminals connected to the rearranging circuit for the output of the R - Y and B - Y component color differential signals;

a line-sequential signal output terminal provided between the frequency-demodulating circuit of the regenerator system and said rearranging circuit for the output of the line-sequential signal derived by the frequency-demodulation from a recording signal recorded in a magnetic recording medium;

a detecting circuit for detecting the d.c. level difference in the line-sequential signal from said regenerator system;

a gain-controlled amplifier for controlling the d.c. level difference in the line-sequential signal from said regenerator system to a prescribed value depending on the output from the detecting circuit;

a clamping circuit for clamping the d.c. level of the line-sequential signal from said gain-controlled amplifier;

a color differential signal discriminating circuit for dicriminating between the R - Y and B - Y components of said line-sequential signal in synchronism with a horizontal synchronizing signal, and for providing a clamp timing signal to said clamping circuit to clamp the line-sequential signal corresponding to either one of the R - Y and B - Y components;

wherein when dubbing is to be performed, said changeover switch switches from a connecting position to connect together said frequency-demodulating circuit and said line-sequencing circuit, to another connecting position to connect together said frequency-modulating circuit and said line-sequential signal input terminal.

* * * * *

UNITED STATES PATENT AND TRADEMARK OFFICE
CERTIFICATE OF CORRECTION

PATENT NO. : 5,029,012
DATED : July 2, 1991
INVENTOR(S) : K. SATO

It is certified that error appears in the above-indentified patent and that said Letters Patent is hereby corrected as shown below:

On cover page, item [57], line 13,
Abstract, delete "controlled" (second occurrence).

On cover page, item [57], line 17,
Abstract, change "sequantial" to ---sequential---.

In the drawings, Figure 7 (sheet 4 of 6), change "GENARATING" to ---GENERATING---.

Signed and Sealed this

Eighth Day of October, 1996

Attest:

BRUCE LEHMAN

Attesting Officer

Commissioner of Patents and Trademarks